June 20, 1967  T. A. RUBLE  3,326,642
PLASTIC LINED CARBON BLACK AGGLOMERATOR
Filed Feb. 24, 1964
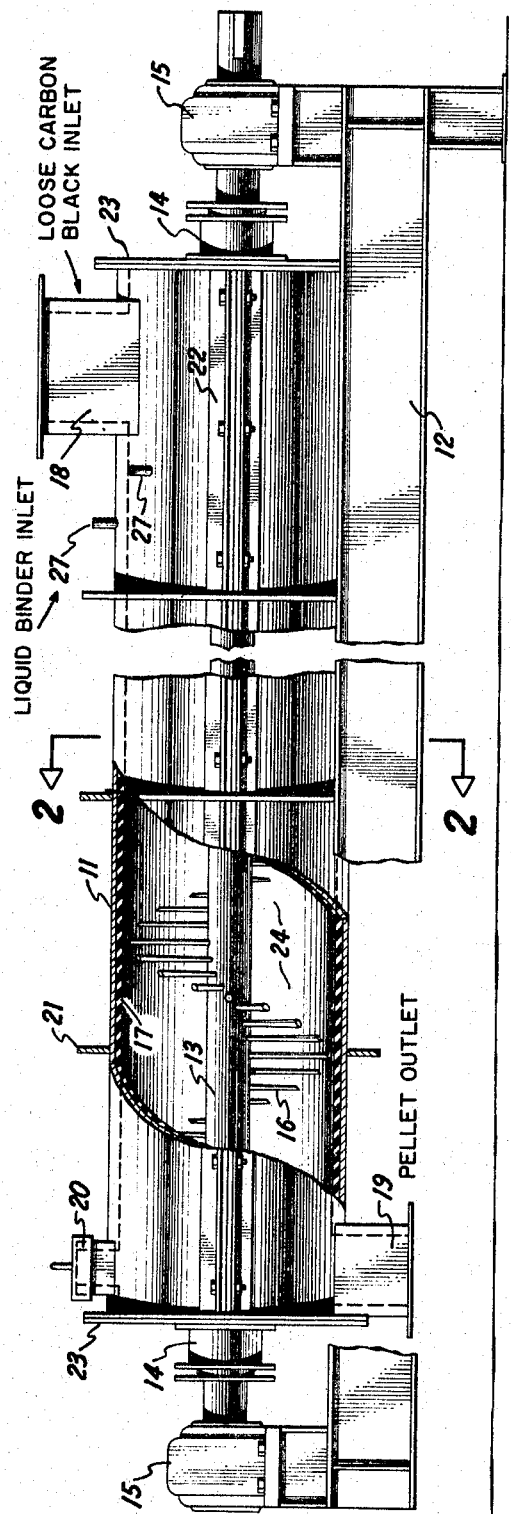
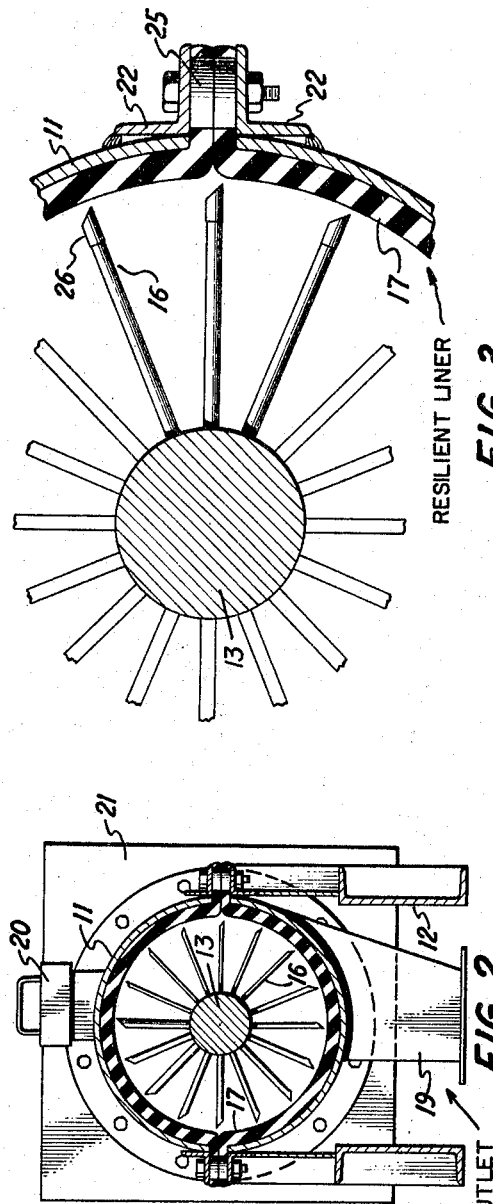
INVENTOR.
THEODORE A. RUBLE
BY William Kammerer United States Patent Office 3,326,642
Patented June 20, 1967

3,326,642
PLASTIC LINED CARBON BLACK
AGGLOMERATOR
Theodore A. Ruble, Houston, Tex., assignor to Continental Carbon Company, Houston, Tex., a corporation of Delaware
Filed Feb. 24, 1964, Ser. No. 346,851
2 Claims. (Cl. 23—314)

This invention relates to an apparatus for converting pulverulent materials into the form of small, generally spherical shaped beads or pellets. More specifically, the present invention concerns an improvement in an apparatus especially adapted for pelleting carbon black powders wherein the beading action is one of violently agitating an aqueous carbon black mixture within a stationary, closed cylindrical chamber.

Carbon blacks as initially produced from conventional methods involving the dissociation or cracking of hydrocarbons either by the so-called furnace, thermal or impingement processes are extremely light, finely divided, bulky materials. While the apparent density of these materials can be increased moderately by a simple deaeration process, the extent of such increase does not result in a product which can be conveniently handled in the various applications in which carbon blacks are used, nor does it result in a product which can be economically transported.

It has been known for a long time that the apparent density of impalpable carbon black can be advantageously increased by conversion of the black to comparatively small, generally spherical and relatively dense beads or pellets. Such beads or pellets are sufficiently stable so that they can be shipped and ultimately used in a dustless condition; and yet their physical structure is fragile enough whereby they can be satisfactorily broken up in the various compounding applications in which carbon black is utilized.

Two principal methods are at present commercially employed for treating carbon black in the manner indicated. One of these methods involves subjecting the black powder in dry form to a rolling action in a drum-like container. This method is generally referred to in the art as a dry pelletizing operation. The other common method and the one to which the present invention is directed, consists of violently agitating the black in the presence of a suitable wetting agent, usually water, in a stationary vessel whose configuration is generally that of an elongated cylinder. In the latter procedure, the requisite agitating or beading action is obtained by rotating within the cylindrical chamber an axially positioned shaft having a plurality of spaced pins radially extending therefrom. In pin pelletizers of this type, the length of the individual pins is such so as to provide a clearance of from about ½ to 1½ inches between the inner surface of the chamber and the tip of the pin. In the operation of a pelletizer device of this type, beading action does not commence until the space between the tip of the pins and the inner surface of the chamber is reduced to between about $\frac{1}{16}$ and ¼ of an inch. This required degree of clearance is quickly realized in the operation of the apparatus through a buildup of a layer of the aqueous carbon black mixture which rather tenaciously adheres to the inner surface of the mixing chamber.

There are several disadvantages to the prior art method for pelletizing carbon black by the wet process. One of these disadvantages is that occasionally chunks of the carbon black liner break off and cause extreme vibration within the pelletizer and additionally result in a product which must be screened. A further disadvantage of the prior art apparatuses is that the ends of the pins are subjected to an undue amount of abrasion, thus causing the pins to wear down rapidly. This wearing action in turn causes the adherent carbon black liner to build up further thereby increasing the incidence of contamination of the carbon black mixture undergoing pelleting with broken-off chunks of the liner. As will be seen hereinbelow, the practice of the present invention substantially obviates the above-described difficulties experienced in the use of the prior art pelletizers, besides providing other advantages.

The improvement in accordance with this invention comprises providing the interior surface of the mixing cylinder or chamber with a resilient plastic liner. Lining a chamber in this manner was initially resorted to in order that standard steel tubing might be satisfactorily employed as the chamber housing for a wet pelleting type operation. Normally, stainless steel tubing is used for this purpose, since aqueous carbon black mixtures are corrosive to standard steel. This expediency did indeed allow the economical use of a standard steel housing, but in addition to this, several surprising and unexpected beneficial effects were noted. It was found that the use of a liner of the type indicated resulted in complete elimination of any type of carbon black build-up upon the interior wall of the mixing chamber. Consequently, by properly adjusting the pin length with respect to the plastic liner so as to provide for proper pelleting action, the pelletizer could be operated for an extended period without the occurrence of product contamination. Additionally, pin wear was observed to be substantially reduced over that experienced in the use of the prior pelletizers. Furthermore, in the practice of this invention pellets of unusually uniform size were obtained.

The improvement generally outlined above will now be particularly described with reference to the accompanying drawing in which:

FIGURE 1 is a vertical side elevational view, partly broken away, of an apparatus exemplifying the present invention.

FIGURE 2 is a cross-sectional view taking on the line 2—2 of FIGURE 1.

FIGURE 3 is an enlarged fragmentary view of that given in FIGURE 2 illustrating in greater detail a preferred construction for the pelletizing pins.

Referring to FIGURE 1, the cylindrical housing for the wet pelletizing or mixing chamber 24 is indicated at 11. This housing is stationary and is preferably positioned horizontally by means of a support assembly such as framework 12. Housing 11 can be advantageously fabricated from mild steel tubing or rolled stock having a gauge thickness of about 10. As will be described more in detail later, I prefer to fabricate the housing member from standard tubing. Housing 11 can have a diameter (I.D.) between about 10 and 24 inches. Satisfactory lengths for the housing range anywhere from 5 to 12 feet.

A rotatable shaft 13 of about 2 to 4 inches diameter (O.D.) extends longitudinally through the center of housing 11 with the ends thereof protruding through packing glands 14 affixed to housing closure plates 23. The terminal portions of rotatable shaft 13 are supported by bearings 15. One of the ends of the shaft extends through the corresponding bearing and is appropriately connected to a suitable drive means. Within housing 11, the entire length of the rotatable shaft 13 is provided with a plurality of radially projecting agitator pins 16. The pins are rigidly mounted at uniformly spaced distances, both longitudinally and angularly, so as to form a multi-flight, helical row thereon. The diameter of the agitator pins can be from ⅜ inch to ⅝ inch. A suitable longitudinal spacing between adjacent pins is in the order of about ¾ inch. Desirably, the pins are constructed of 310 stainless steel.

Adherently attached to the whole of the interior surface of the housing 11 is a resilient plastic liner 17. Advantageously, such a liner is provided for the various access appurtenances communicating with the interior of the pelleting chamber. The resilient liner 17 can be cemented to the housing 11 or in the case of certain liners, such as the preferred rubber types, can be vulvanized in place. As indicated, the preferred type of plastic liner is either natural or synthetic rubber. Among the synthetic rubbers which are particularly useful in the practice of this invention are the oil-resistant synthetic elastomers; for example, the various commercially available butadiene-acrylonitrile and butadiene-styrene copolymers. Equally satisfactory lining materials are represented by the chloroprene rubbers derived in the polymerization or copolymerization of 2-chlorobutadiene 1-3, plasticized polyvinylchloride compositions and the urethane polymers. Adequate thicknesses of the liner range from about ¼ to 1 inch.

Charging chute 18 is provided for the introduction of carbon black powder into the pelletizer. The carbon black is preferably deaerated prior to charging same, although pre-conditioning in this manner is not essential. While the present invention is illustrated in connection with the preferred embodiment thereof, it is to be understood that the usefulness of the invention is not confined to the pelleting of carbon black. The advantages inherent in my improvement can be realized in the like treatment of any type of pulverulent materials. More specifically in this regard, various powderly mineral pigments as well as the various impalpable dyes and pigments of organic nature can be advantageously pelleted in the practice of this invention.

In order to carry out the wet pelleting operation, either water, dilute molasses solution or other suitable wetting agent is introduced into the mixing or pelleting chamber via inlet 27. As is well known in the art, the amount of wetting agent to be introduced in this manner ranges between about 35 to 65 percent by weight of the finished product. The exact amount of wetting agent depends primarily on the particular type of material subjected to pelleting. Near the downstream extremity of the pelletizer there is a product discharge chute 19. Diametrically opposite product chute 19 there is an access port 20. Port 20 is ordinarily provided in order that from time to time one may observe the pelleting process. Additionally, it conveniently permits freeing the product port in the event the latter should temporarily clog up.

A preferred manner for constructing a pelletizer in accordance with this invention will now briefly be set forth. First, a standard steel tubing of desired diameter is cut to an appropriate length. A number of appropriately apertured rectangular reinforcing plates 21 are then placed about the external of housing 11 and spaced uniformly along its length. These reinforcing plates are rigidly affixed to the housing by welding. Next, the tube is split into two equal semi-cylindrical sections by acetylene torch cutting. To the edge segments of the resultant semi-cylindrical portions are welded angle irons 22. The construction resulting in the attachment of the angle irons is more clearly shown in FIGURE 3. The whole of the interior of each of the semi-cylindrical sections is provided with a liner of the type described hereinabove. A sufficient overlap of the liner is allowed for covering the portion of the angle iron projecting from the semi-cylindrical section. The two lined semi-cylindrical sections are finally joined by bolting together the corresponding angle iron projections. It has been found desirable to use a metal washer 25 at each site where a bolt connection means is employed. These washer provisions prevent over-squeezing of the plastic liner at this juncture. This preferred type of construction is shown in detail in FIGURE 3.

Referring now specifically to FIGURE 3, the agitator pins 16 are shown as extending almost to the surface of the plastic liner. The distance at which the tip of the pin is disposed from the surface of the liner is relatively critical and should be between about 1/16 to ¼ inch. In the usual pelleting procedures, a relatively high degree of abrasion occurs at the ends of the pelleting pins resulting in a gradual wearing away and consequent reduction in the length of the pin. This lessening of pin length does not have a particularly adverse effect on the pelleting operation in the use of the prior art apparatuses because the wet carbon black build-up experienced therein will automatically compensate for any pin wear that occurs. In the use of the plastic liner in accordance with this invention, however, there is no build-up of carbon black whatsoever on the liner and consequently, the wearing away at the end of the pin will, by comparison, prematurely effect the efficiency of the pelleting operation. It has been observed, however, that if an abrasive-resistant coating 26 is applied to the ends of the pin, the pelletizer of this invention can be operated for an extended period, generally more than a year, without the occurrence of any substantial loss of pelleting efficiency. A suitable coating for this purpose consists of a flame-sprayed application of a hard surfacing alloy such as tungsten carbide or ni-chrome. Other alloys are applicable: the main requirement for such abrasion-resistant coatings is that they have a sufficient degree of corrosion resistance to the wet carbon black. As shown in FIGURE 3, the ends of the agitator pins are preferably tapered at about a 45° angle. In employing tapered pins, the direction of rotation is such whereby the taper face trails. In other words, the direction of rotation of the pin assembly shown in FIGURE 3 would be clockwise.

It will be understood by those skilled in the art that various modifications of the invention illustrated above can be made without departing from the spirit and scope thereof; and therefore, the only limitations intended are those expressed in the appended claims.

What is claimed is:

1. Apparatus for wet pelletizing carbon black comprising, in combination, a substantially rigid elongate cylindrical housing, an adherent resilient plastic liner covering the entire interior of said substantially rigid elongated cylindrical housing; closures for the ends of said substantially rigid elongate cylindrical housing; means for feeding the pulverulent carbon black into said substantially rigid elongate cylindrical housing adjacent one end thereof; means for introducing liquid into said substantially rigid elongate cylindrical housing adjacent the end entered by the pulverulent carbon black; means for forming the wetted carbon black into a layer covering the inner surface of said resilient plastic liner; said means including a rotatable shaft disposed axially in said elongate cylindrical housing and journaled in the end closures thereof, means for imparting rotation to said rotatable shaft; a plurality of radially extending and uniformly spaced agitator pins having tapered ends and mounted on said rotatable shaft and arranged to form a helical row thereon; the length of said agitator pins being such as to provide a space between their outer ends and the inner surface of said resilient plastic liner of from approximately 0.0625 inch to approximately 0.25 inch; and means for discharging the wet pellets from said elongate cylindrical housing.

2. The apparatus for claim 1 in which the agitator pins are coated with an abrasion resistant material.

References Cited

UNITED STATES PATENTS

| Re. 23,825 | 5/1954 | Clark | 23—313 X |
| 2,131,686 | 9/1938 | Heller | 23—314 |
| 2,924,847 | 2/1960 | Keiding | 23—313 X |
| 3,011,876 | 12/1961 | Raistrick | 23—313 X |

NORMAN YUDKOFF, *Primary Examiner.*

S. J. EMERY, *Assistant Examiner.*